United States Patent [19]

Herd et al.

[11] Patent Number: 4,638,054
[45] Date of Patent: Jan. 20, 1987

[54] AMINONAPHTHOL BISAZO REACTIVE DYES

[75] Inventors: Karl J. Herd; Martin Michna, both of Cologne, Fed. Rep. of Germany

[73] Assignee: Bayer Aktiengesellschaft, Leverkusen, Fed. Rep. of Germany

[21] Appl. No.: 662,334

[22] Filed: Oct. 18, 1984

[30] Foreign Application Priority Data

Nov. 10, 1983 [DE] Fed. Rep. of Germany ....... 3340590

[51] Int. Cl.$^4$ .................... G09B 62/02; G09B 62/022; G09B 62/026; G09B 62/03
[52] U.S. Cl. .................................. 534/637; 534/588; 534/598; 534/634; 534/635; 534/641; 534/642; 534/643; 534/887
[58] Field of Search ............... 534/622, 632, 626, 634, 534/635, 636, 637, 641, 642, 643

[56] References Cited

U.S. PATENT DOCUMENTS

| | | | |
|---|---|---|---|
| 3,029,123 | 4/1962 | Putter et al. | 534/632 X |
| 3,082,201 | 3/1963 | Koller | 534/638 |
| 3,126,367 | 3/1964 | Hensbl et al. | 534/632 X |
| 3,256,275 | 6/1966 | Tartter et al. | 534/632 X |
| 3,290,282 | 12/1966 | Kissa | 534/626 |
| 3,413,077 | 11/1968 | Bertin et al. | 534/638 X |
| 3,416,875 | 12/1968 | Ponzini et al. | 534/638 X |
| 3,429,870 | 2/1969 | Carati et al. | 534/638 X |
| 3,585,181 | 6/1971 | Jager et al. | 534/626 |
| 4,065,446 | 12/1977 | Bien et al. | 534/632 X |
| 4,294,580 | 10/1981 | Henk et al. | 534/637 |

Primary Examiner—Floyd D. Higel

[57] ABSTRACT

The invention provides new reaction dyestuffs of the formula

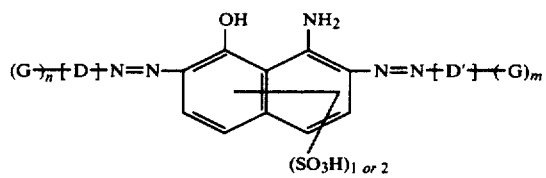

where
n and m are each 0 or 1 such that $n+m=1$ or 2 and
where
G is a radical of the formula

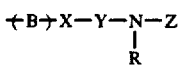

wherein
B is a direct bond between D or D' and X or represents a bridge member as described in the specification,
X is S, SO or SO$_2$,
Y is optionally substituted alkylene,
R is H, optionally substituted C$_1$–C$_4$-alkyl or optionally substituted C$_2$–C$_4$-alkylene or optionally substituted phenylalkylene,
Z is a fibre-reactive radical, and where
D and D' are as defined in the body of the Application.

On hydroxyl- or amide-containing textile materials the new reactive dyestuffs produce prints and dyeings of a high fastness level.

5 Claims, No Drawings

AMINONAPHTHOL BISAZO REACTIVE DYES

The invention relates to new reactive dyestuffs of the formula

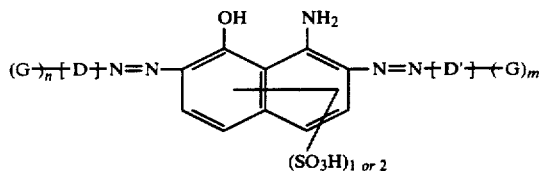

(1)

and to their alkali metal salts, where
G is a radical of the formula

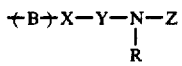

n and m are each 0 or 1 such that $n+m=1$ or 2,
D and D' are each optionally azo-containing radicals of the benzene or naphthalene or of the heterocyclic series,
B is a direct bond between D or D' and X or a bridge member of the structure (2) to (5)

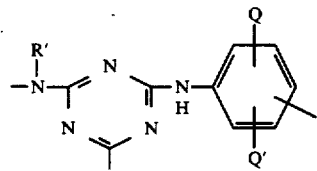 (2)

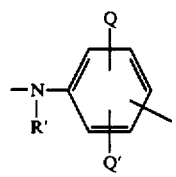 (3)

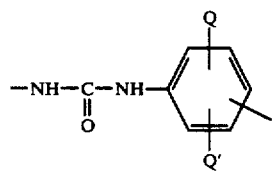 (4)

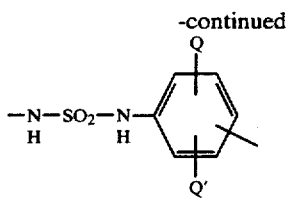 (5)

each of which is bonded with the amine function to a C atom of the ring system of D or D' and with the free function of the phenyl system to X
and where
X is S, SO or $SO_2$,
Y is optionally substituted alkylene,
R is H, optionally substituted $C_1$–$C_4$-alkyl or optionally substituted $C_2$–$C_4$-alkylene or optionally substituted phenylalkylene,
Z is a fibre-reactive radical,
R' is H, optionally substituted alkyl or optionally substituted aryl,
W is OH, Cl, F, Br, $SO_3H$, NHR',

optionally substituted alkoxy, optionally substituted phenoxy or an optionally substituted mercaptyl radical, and
Q and Q', independently of each other, are each H, OH, halogen, $SO_3H$, COOH, optionally substituted $C_1$–$C_4$-alkyl or optionally substituted $C_1$–$C_4$-alkoxy.

Preferred reactive dyestuffs have the formula (1) where
G is

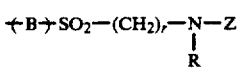

where
r is 2 or 3
and where
the radicals D, D', n, m, B, R, R', n, m, B, R, R', Z, W, Q and Q' are as defined under the formula (1).
Similarly preferred reactive dyestuffs have the formula

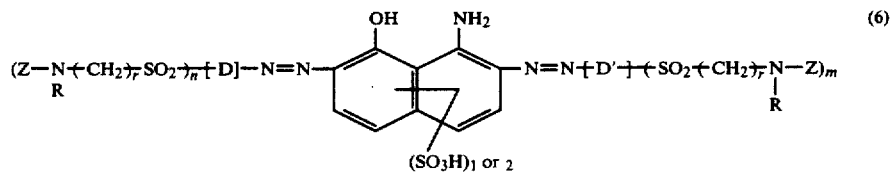 (6)

where
B takes the form of the direct bond between D or D' and the $SO_2$ group.
Similarly preferred reactive dyestuffs have the formula

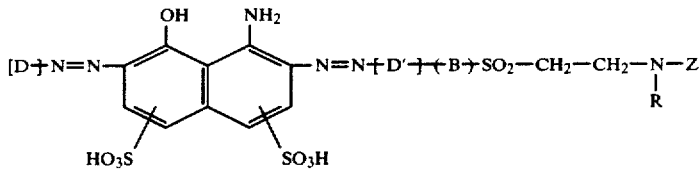

(7)

where
D, D', B, R and Z are as defined under the formula (1).

Likewise preferred reactive dyestuffs have the formula (7) where D represents a naphthalenemonosulphonic or naphthalenedisulphonic acid radical of the formula (8) or an azobenzenesulphonic acid radical of the formula (9):

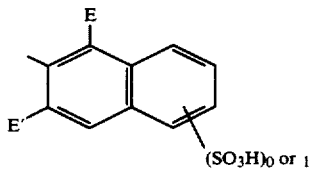

(8)

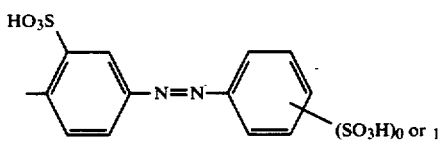

(9)

wherein
one of the groups E and E' represents H while the other represents $SO_3H$.

The R radicals of the formula (1) to (7) are preferably hydrogen, $C_1$-$C_4$-alkyl or $C_2$-$C_4$-alkylene each of which is optionally substituted by OH, halogen (in particular Cl), $SO_3H$, $OSO_3H$, COOH, or $C_1$-$C_4$-alkoxy (in particular methoxy), or optionally $SO_3H$-substituted phenylalkylene having 1 to 4C atoms in the alkyl moiety. Specific examples of the radical R are:
$CH_3$, $C_2H_5$, —n—$C_3H_7$, —iso—$C_3H_7$, —n—$C_4H_9$, —iso—$C_4H_9$, —$CH_2$—CH=$CH_2$, —$CH_2CH_2OH$, —$CH_2CH_2$—Cl, —$CH_2$—$CH_2$—$SO_3H$, —$CH_2$—$CH_2$—$OSO_3H$, —$CH_2CH_2$—$CO_2H$, —$CH_2$—$CO_2H$, —$CH(CH_3)$—$CO_2H$, $CH_2$—$CH_2$—$OCH_3$, —$CH_2$—$CH(OH)$—$CH_3$, $CH_2$—$CH_2$—$CH(OH)CH_3$, $CH_2$—$CH_2$—$CH_2$—$CO_2H$,

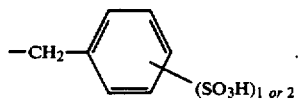

Y preferably represents optionally OH—, $SO_3H$—, halogen- or COOH-substituted alkylene ($C_1$-$C_6$), specific examples being:
—$CH_2$—, —$CH_2$—$CH_2$—, —$CH_2$—$CH_2$—$CH_2$—, —$CH_2$—$CH(CH_3)$—$CH_2$—, —$CH(CH_3)$—$CH_2$—$CH_2$—, —$CH_2$—$CH_2$—$CH_2$—

R' preferably represents hydrogen, optionally OH— or COOH-substituted $C_1$-$C_4$-alkyl or phenyl W preferably represents OH, Cl, F or NHR'

Q and Q' each preferably represent H.

The R' of the formulae (2) and (3) preferably represents H and $C_1$-$C_4$-alkyl.

The fibre-reactive radicals Z are to be understood as meaning radicals with one or more reactive groups or detachable substituents which, on application of the dye-stuffs to cellulose materials in the presence of acid-binding agents and, if necessary, under heat, are capable of forming covalent bonds with the hydroxyl groups of the cellulose or, on application to superpolyamide fibres, such as wool, are capable of forming covalent bonds with the NH groups of these fibres. A large number of such fibre-reactive groupings have been described in the literature.

Reactive groups which are suitable according to the invention containing at least one detachable substituent bonded to a heterocyclic radical or to an aliphatic radical include those which contain at least one reactive substituent bonded to a 5- or 6-membered heterocyclic ring, such as to a monazine, diazine, triazine, for example pyridine, pyrimidine, pyridazine, pyrazine, thiazine, oxazine or an asymmetrical or symmetrical triazine ring, or to such a ring system as has one or more fused-on aromatic rings, such as to a quinoline, phthalazine, cinnoline, quinazoline, quinoxaline, acridine, phenazine or phenanthridine ring system; accordingly, the 5- or 6-membered heterocyclic rings which have at least one reactive substituent are preferably of the type which contains one or more nitrogen atoms and can contain fused-on 5- or preferably 6-membered, carbocyclic rings.

Examples of the reactive substituents on the heterocyclic structure are halogen (Cl, Br or F), ammonium, including hydrazinium, sulphonium, sulphonyl, azido($N_3$), thiocyanato, thio, thioether, oxyether, sulphinic acid and sulphonic acid.

Specific examples are monohalogeno- or dihalogeno-symmetrical-triazinyl radicals, for example 2,4-dichlorotriazin-6-yl, 2-amino-4-chlorotriazin-6-yl, 2-alkylamino-4-chlorotriazin-6-yl, such as 2-methylamino-4-chlorotriazin-6-yl, 2-ethylamino- or 2-propylamino-4-chlorotriazin-6-yl, 2-$\beta$-oxyethylamino-4-chlorotriazin-6-yl, 2-di-$\beta$-oxyethylamino-4-chlorotriazin-6-yl and the corresponding sulphuric acid half-esters, 2-diethylamino-4-chlorotriazin-6-yl, 2-morpholino- or 2-piperidino-4-6-, 2-arylamino- and substituted arylamino-4-chlorotriazin-6-yl, such as 2-phenylamino-4-chlorotriazin-6-yl, 2-(o-, m- or p-carboxy- or sulphophenyl)-amino-4-chlorotriazin-6-yl, 2-alkoxy-4-chlorotriazin-6-yl, such as 2-methoxy- or ethoxy-4-chlorotriazin-6-yl, 2-(phenylsulphonylmethoxy)-4-chlorotriazin-6-yl, 2-aryloxy and substituted aryloxy-4-chlorotriazin-6-yl, such as 2-phenoxy-4-chlorotriazin-6-yl, 2-(p-sulphophenyl)-oxy-4-chlorotriazin-6-yl, 2-(o-, m- or p-methyl- or methoxyphenyl)-oxy-4-chloro-triazin-6-yl, 2-alkylmercapto- or 2-arylmercapto- or 2-(substituted aryl)-mercapto-4-chlorotriazin-6-yl, such as 2-$\beta$-hydroxyethylmercapto-4-chlorotriazin-6-yl, 2-phenylmercapto-4-chlorotriazin-6-yl, 3-(4'-methylphenyl)-mercapto-4-chlorotriazin-6-yl, 2-(2',4'-dinitro)-phenylmercapto-4-chlorotriazin-6-yl, 2-(2',4'-dinitro)-phenylmercapto-4-chlorotriazin-6-yl, 2-methyl-4-chlorotriazin-6-yl, 2-phenyl-4-chlorotriazin-6-yl, 2,4-difluorotriazin-6-yl, monofluorotriazinyl radicals which are substituted by amino, alkylamino, aralkylamino or acylamino groups, alkyl denoting in particular optionally substituted $C_1$–$C_4$-alkyl, aralkyl denoting in particular optionally substituted phenyl, $C_1$–$C_4$-alkyl and aryl denoting in particular optionally sulpho-, alkyl-, in particular $C_1$–$C_4$-alkyl-, alkoxy-, in particular $C_1$–$C_4$-alkoxy-, carboxyl-, acylamino- and halogen-, such as fluorine-, chlorine- or bromone-, -substituted phenyl or naphthyl, for example 2-amino-4-fluorotriazin-6-yl, 2-methylamino-4-fluoro-triazin-6-yl, 2-ethylamino-4-fluoro-triazin-6-yl, 2-iso-propylamino-4-fluorotriazin-6-yl, 2-dimethylamino-4-fluoro-triazin-6-yl, 2-diethylamino-4-fluoro-triazin-6-yl, 2-β-methoxy-ethylamino-4-fluoro-triazin-6-yl, 2-β-hydroxyethylamino-4-fluoro-triazin-6-yl, 2-di-(β-hydroxyethylamino)-4-fluoro-triazin-6-yl, 2-β-sulphoethylamino-4-fluoro-triazin-6-yl, 2-β-sulphoethyl-methylamino-4-fluoro-triazin-6-yl, 2-carboxymethylamino-4-fluoro-triazin-6-yl, 2-β-cyanoethylamino-4-fluorotriazin-6-yl, 2-benzylamino-4-fluoro-triazin-6-yl, 2-β-phenylethylamino-4-fluoro-triazin-6-yl, 2-benzyl-methylamino-4-fluoro-triazin-6-yl, 2-(x-sulpho-benzyl)-amino-4-fluoro-triazin-6-yl, 2-cyclohexylamino-4-fluoro-triazin-6-yl, 2-(o-, m- or p-methylphenyl)-amino-4-fluoro-triazin-6-yl, 2-(o-, m- or p-sulphophenyl)-amino-4-fluoro-triazin-6-yl, 2-(2',5'-disulphophenyl)-amino-4-fluoro-triazin-6-yl, 2-(o-, m- or p-chlorophenyl)-amino-4-fluoro-triazin-6-yl, 2-(o, m- or p-methoxyphenyl)-4-fluoro-triazin-6-yl, 2-(2'-methyl-4'-sulphophenyl)-amino-4-fluoro-triazin-6-yl, 2-(2'-methyl-5'-sulphophenyl)-amino-4-fluoro-triazin-6-yl, 2-(2'-chloro-4'-sulphophenyl)-amino-4-fluoro-triazin-6-yl, 2-(2'-chloro-5'-sulphophenyl)-amino-4-fluoro-triazin-6-yl, 2-(2'-methoxy-4'-sulphophenyl)-amino-4-fluoro-triazin-6-yl, 2-(o, m- or p-carboxyphenyl)-amino-4-fluoro-triazin-6-yl, 2-(2',4'-disulphophenyl)-amino-4-fluoro-triazin-6-yl, 2-(3',5'-disulphophenyl)-amino-4-fluoro-triazin-6-yl, 2-(2'-carboxy-4'-sulphophenyl)-amino-4-fluoro-triazin-6-yl, 2-(6'-sulphonapthyl-(2'))-amino-4-fluoro-triazin-6-yl, 2-(4',8'-disulphonaphthyl-(2'))-amino-4-fluoro-triazin-6-yl, 2-(6',8'-disulphonaphthyl-(2'))-amino-4-fluoro-triazin-6-yl, 2-(N-methylphenyl)-amino-4-fluoro-triazin-6-yl, 2-(N-ethylphenyl)-amino-4-fluoro-triazin-6-yl, 2-(N-β-hydroxyethylphenyl)-amino-4-fluoro-triazin-6-yl, 2-(N-iso-propylphenyl)amino-4-fluoro-triazin-6-yl, 2-morpholino-4-fluoro-triazin-6-yl, 2-piperidino-4-fluoro-triazin-6-yl, 2-(4',6',8'-trisulphonaphthyl-(2'))-4-fluoro-triazin-6-yl, 2-(3',6',8'-trisulphonaphthyl-(2'))-4-fluoro-triazin-6-yl, 2-(3',6'-disulphonaphthyl-(1'))-4-fluoro-triazin-6-yl, monohalogenopyrimidinyl, dihalogenopyrimidinyl or trihalogenopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulpho- or -5-monochloromethyl-, 5-di-chloromethyl- or -5-trichloromethyl- or -5-carboalkoxypyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl- or -6-carbonyl, 2,4-dichloroquinazoline-7- or -6-sulphonyl- or -carbonyl, 2- or 3- or 4-(4',5'-dichloropyridaz-6'-on-1'-yl)-phenylsulphonyl or -phenylcarbonyl, β-(4',5'-dichloropyridaz-6'-on-1'-yl)-ethylcarbonyl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl and the corresponding bromine and fluorine derivatives of the abovementioned chlorine-substituted heterocyclic radicals, among which are, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloro-methyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoro-methyl-4-pyrimidinyl, 2-fluoro-5-phenyl- or -5-methyl-sulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; sulphonyl-containing triazine radicals, such as 2,4-bis-(phenylsulphonyl)-triazin-6-yl, 2-(3'-carboxyphenyl)-sulphonyl-4-chlorotriazin-6-yl, 2-(3'-sulphophenyl)-sulphonyl-4-chloro-triazin-6-yl, 2,4-bis-(3'-carboxyphenylsulphonyl)-triazin-6-yl; sulphonyl-containing pyrimidine rings, such as 2-carboxymethylsulphonyl-pyrimidin-4-yl, 2-methylsulphonyl-6-methyl-pyrimidin-4-yl, 2-methylsulphonyl-6-ethyl-pyrimidin-4-yl, 2-phenylsulphonyl-5-chloro-6-methylpyrimidinyl, 2,6-bis-methylsulphonyl-pyrimidin-4-yl, 2,6-bis-methylsulphonyl-5-chloro-pyrimidin-4-yl, 2,4-bis-methyl-sulphonyl-pyrimidine-5-sulphonyl, 2-methylsulphonylpyrimidin-4-yl, 2-phenylsulphonyl-pyrimidin-4-yl, 2-trichloromethylsulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethyl-pyrimidin-4-yl, 2-methylsulphonyl-5-chloro-6-chloromethyl-pyrimidin-4-yl, 2-methylsulphonyl-4-chloro-6-methyl-pyrimidine-5-sulphonyl, 2-methylsulphonyl-5-nitro-6-methyl-pyrimidin-4-yl, 2,5,6-tris-methylsulphonylpyrimidin-4-yl, 2-methylsulphonyl-5,6-dimethyl-pyrimidin-4-yl, 2-ethylsulphonyl-5-chloro-6-methyl-pyrimidin-4-yl, 2-methyl-sulphonyl-6-chloro-pyrimidin-4-yl, 2,6-bis-methylsulphonyl-5- chloro-pyrimidin-4-yl, 2-methylsulphonyl-6-carboxy-pyrimidin-4-yl, 2-methylsulphonyl-5-sulpho-pyrimidin-4-yl, 2-methylsulphonyl-6-carbomethoxy-pyrimidin-4-yl, 2-methyl-sulphonyl-5-carboxy-pyrimidin-4-yl, 2-methylsulphonyl-5-cyano-6-methoxy-pyrimidin-4-yl, 2-methylsulphonyl-5-chloro-pyrimidin-4-yl, 2-sulpho-ethyl-sulphonyl-6-methyl-pyrimidin-4-yl, 2-methylsulphonyl-5-bromopyrimidin-4-yl, 2-phenylsulphonyl-5-chloro-pyrimidin-4-yl, 2-carboxymethylsulphonyl-5-chloro-6-methyl-pyrimidin-4-yl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl, 2-methylsulphonyl-4-chloro-6-methyl-pyrimidine-5-sulphonyl- or -carbonyl; ammonium-containing triazine rings, such as trimethylammonium-4-phenylamino- or -4-(o-, m- or p-sulphophenyl)-aminotriazin-6-yl, 2-(1,1-dimethylhydrazinium)-4-phenylamino or -4-(o-, m- or p-sulpho-phenyl)-aminotriazin-6-yl, 2-(2-isopropylidene-1,1-dimethyl)-hydrazinium-4-phenylamino- or -4-(o-, m- or p-sulphophenyl)-aminotriazin-6-yl, 2-N-aminopyrrolidinium- or 2-N-aminopiperidinium-4-phenylamino- or -4-(o-, m- or p-sulphophenyl)-amino triazin-6-yl, and also 4-phenylamino or 4-(sulphophenylamino)-triazin-6-yl radicals which contain 1,4-bis-azabicyclo[2,2,2]octane or 1,2-bis-azabicyclo[0,3,3]octane in the 2-position in a quaternary bond via nirogen, 2-pyridinium-4-phenylamino- or -4-(o-, m- or p-sulphophenyl)aminotriazin-6-yl and corresponding 2-oniumtriazin-6-yl radicals which are substituted in the 4-position by alkylamino, such as methylamino, ethylamino or β-hydroxyethylamino, or alkoxy, such as methoxy or ethoxy, or aroxy, such as phenoxy or sulphophenoxy groups; 2-chlorobenzothiazole-5- or -6-carbonyl or -5- or -6-sulphonyl, 2-aryl-sulphonylbenzothiazole- or -alkylsulphonylbenzothiazole-5- or -6-carbonyl or -5- or -6-sulphonyl, such as 2-methylsulphonylbenzothiazole- or -2-ethylsulphonylbenzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or -sulphonyl derivatives which contain sulphur groups in the fused-on benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methyl-1,3-thiazole-5-carbonyl or -4- or -5-sulphonyl, N-oxide of 4-chloroquinoline- or -4-nitroquinoline-5-carbonyl.

A mention should also go to reactive groups of the aliphatic series, such as acryloyl, monochloroacryloyl, dichloroacryloyl or trichloroacryloyl, such as —CO—CH=CH—Cl, —CO—CCl=CH₂, —CO—CCl=CH—CH₃, and also —CO—CCl=CH—COOH, —CO—CH=CCl—COOH, β-chloropropionyl, 3-phenylsulphonylpropionyl, 3-methylsulphonylpropionyl, β-sulphato-ethylaminosulphonyl, vinylsulphonyl, β-chloroethylsulphonyl, β-sulphatoethylsulphonyl, β-methylsulphonyl-ethylsulphonyl, β-phenylsulphonylethylsulphonyl, 2-fluoro-2-chloro-3,3-difluorocyclobutane-1-carbonyl, 2,2,3,3-tetrafluorocyclobutane-1-carbonyl or -1-sulphonyl, β-(2,2,3,3-tetrafluorocyclobut-1-yl)-acryloyl, α- or β-bromoacryloyl, α- or β-alkyl- or arylsulphonylacryloyl group, such as α- or β-methylsulphonylacryloyl.

Fibre-reactive radicals of the halogenopyrimidine, halogenotriazine and halogenoacrylic acid series are particularly preferred.

The dyestuffs of the formula (1) are obtainable by condensing amines of the formula

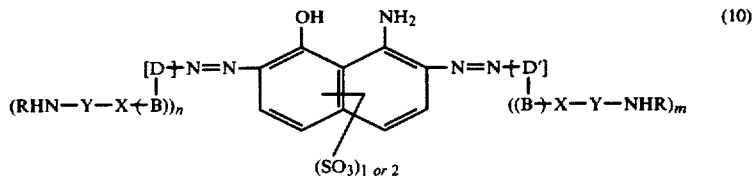
(10)

with a reactive compound of the structure (11)

Z—L  (11)

where L signifies a leaving group, such as, for example, F, Cl or Br, and Z is as defined under formula (1), under known conditions or by diazotising aniline derivatives of the structure (12)

(12)

in conventional manner and coupling the diazotised product onto coupling components of the formula (13).

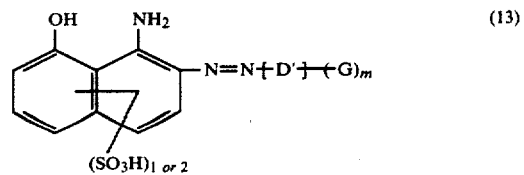
(13)

Reactive dyestuffs of the formula (7) are obtainable by condensing amines of the formula

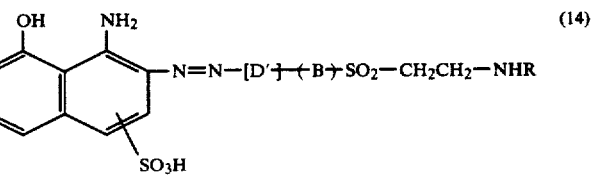
(14)

with a reactive compound of the structure (11) under known conditions or by diazotising aniline derivatives of the formula (15)

(15)

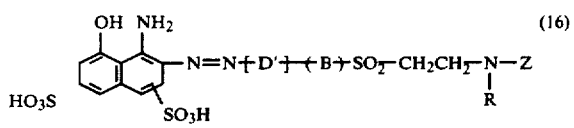

(16)

where D is preferably as defined under the formulae (8) and (9), in conventional manner and coupling the diazotised product onto coupling components of the formula (16).

The dyestuff intermediate products of the formula (14) are obtainable by reacting chromophores of the structure

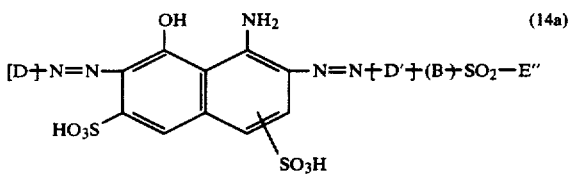

(14a)

where

E'' is —CH=CH$_2$ or —CH$_2$—CH$_2$—T and
T is OH, Cl, Br, OSO$_3$H, SSO$_3$H, OP(OH)$_2$, OCOCH$_3$ and OCO$_2$CH$_3$, with excess ammonia or an amine of the formula R—NH$_2$.

In a special variant for preparing dyestuff intermediate products of the formula (14a) where δ represents a direct bond, D has the formula (8) or the formula (9), D' represents a radical of the benzene series, and E is as defined under formula (14a), the two diazo components D—NH$_2$ and H$_2$N-[-D-]-SO$_2$—E'' are diazotised together in the sense of a so-called "single-vessel process", the neutral solution of 8-amino-1-hydroxynaphthalene-3,6-(or 3,5)-disulphonic acid is metered in and the mixture is gradually brought from pH 0.5–1.5 to pH 5.5–6.5.

In this variant, initial coupling of diazotised H$_2$N-[-D-'-]-SO$_2$—E'' in the acid pH range above pH 4 is followed by coupling of diazotised D—NH$_2$. The result is a uniform dyestuff intermediate product of the formula (14a).

The dyestuff precursors and intermediates such as, for example, the compounds of the formulae (10), (12), (13), (14) and (16), can be prepared as follows:

Alkylation of thiophenols or benzenesulphinates of the formula

(17)

(18)

(where, in the formulae (17) and (18), D can also be replaced by D') with compounds of the formula R—NH—Y—OSO$_3$H (in particular those of the formula R—NH—(CH$_2$)$_p$—CH$_2$—OSO$_3$H, where p=0, 1, 2 or 3) or, for example, also with ammonium salts of the formula

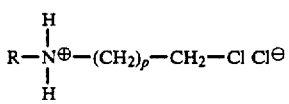

(where p = 0, 1, 2, 3), (where p=0, 1, 2 or 3), followed if desired by an oxidation with, for example, H$_2$O$_2$ and subsequent hydrolysis of the protective acetyl group.

A further way of preparing intermediates involves, for example, alkylating appropriate nitrothiophenols (19) and nitrobenzenesulphinates (20)

(19)

(20)

(where, in the formulae (19) and (20), D can also be replaced by D')
with compounds of the formula R—NH—Y—OSO$_3$H (in particular those of the formula R—NH—(CH$_2$)$_p$—CH$_2$—OSO$_3$H, where p=0, 1, 2 or 3) or, for example, also with ammonium salts of the formula R—NH$_2$—(CH$_2$)$_p$—CH$_2$—ClCl$^\ominus$ (where p=0, 1, 2 or 3$^\oplus$) and subsequent reduction of the nitro function.

This way can be used for example to prepare aniline derivatives (21) to (23):

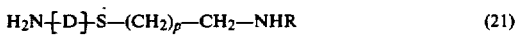 (21)

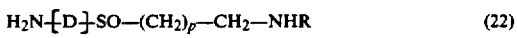 (22)

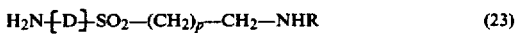 (23)

where in the formulae (21) to (23) D can also be replaced by D'.

Examples of compounds of the formulae (21) to (23) are

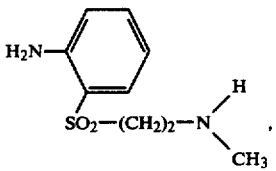

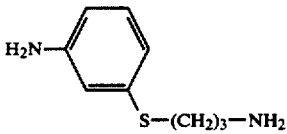

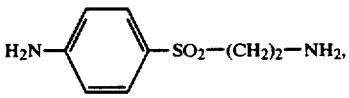

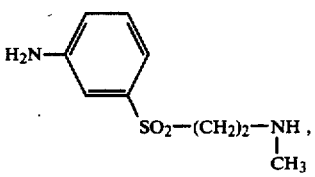

-continued

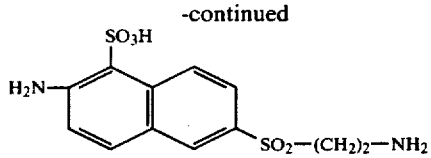

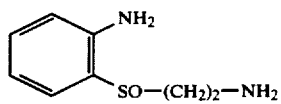

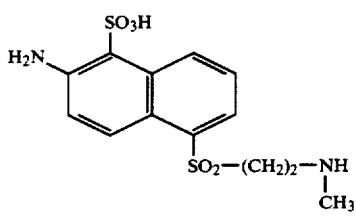

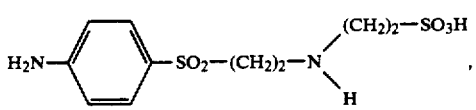

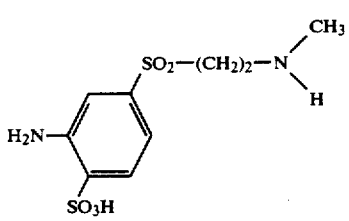

Other customary ways of preparing derivatives (21) to (23) are described, for example, in the following publications: J. Chem. Soc. [London] 1945, 826; J. Org. Chem. 15, 413 (1950) and Biochem. J. 39, 85 (1945).

The above synthesis operations can also b used, inter alia, for preparing naphthylamine derivatives of the formula (24):

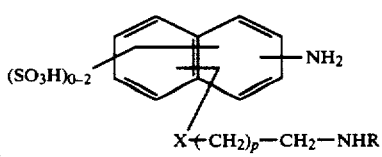

(24)

where X and R are as defined under formula (1) and p=0, 1, 2 or 3.

Another variant of synthesising compounds (21) to (24) where R=H comprises for example also alkylating precursors (17) to (20) with acylonitrile, methacrylonitrile, 2-butenonitrile and subsequently reducing the cyano or nitro group or subsequently hydrolysing the acylamino group, as described, for example, in Published British Patent Application No. 2,088,359.

Another way of synthesising amino compounds (21) to (24) where X=SO₂ and Y=—CH₂—CH₂— comprises reacting compounds of the structure (25) to (28), as mentioned, for example, in German Offenlegungsschriften Nos. 1,943,904, 2,142,727, 2,142,728 or 2,748,975 and in Japanese Published Patent Application No. 43,501/1973,

(25)

(26)

(27)

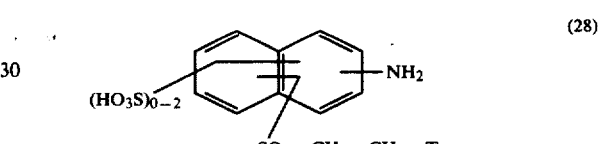

(28)

where the benzene rings A and A' can be optionally substituted by further substituents (for example halogen, hydroxyl, alkyl, alkoxy, carboxyl or sulpho substituents) and where T=OH, Cl, Br, OSO₃H, SSO₃H, OPO(OH)₂, OCOCH₃ or OCO₂CH₃, at 20°-100° C. with an excess of ammonia or primary aliphatic amine of the formula RNH₂. This method of synthesis if known, for example, from German Offenlegungsschrift No. 1,943,904 (Example 4) and Japanese Patent Application No. 07,923/1973 [CA 84:148968 c(1973)].

By diazotising these amino compounds (21) to (24) and coupling the diazotised product onto 1-amino-8-naphtholmonosulphonic or -naphtholdisulphonic acids under acid conditions and subsequently performing a second coupling under neutal or basic conditions or by coupling the diazotised amino compounds (21) to (24) onto previously monocoupled 1-amino-8-naphthol-monosulphonic or -naphtholdisulphonic acids, it is possible to build up, for example, dyestuff precursors as given under the formulae (10) and (14).

These chromophores (10) where X=SO₂ and Y=—CH₂—CH₂ and (14) can also be prepared by introducing the aliphatic amine radical with ammonia or with RNH₂ directly from chromophoric compounds of the formulae (29) to (32).

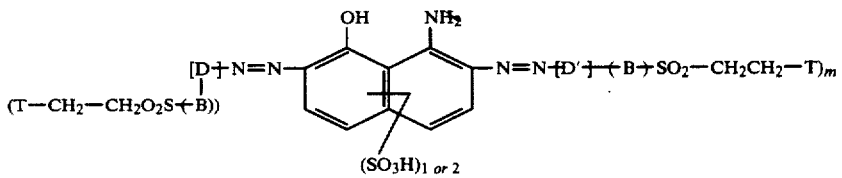

(29)

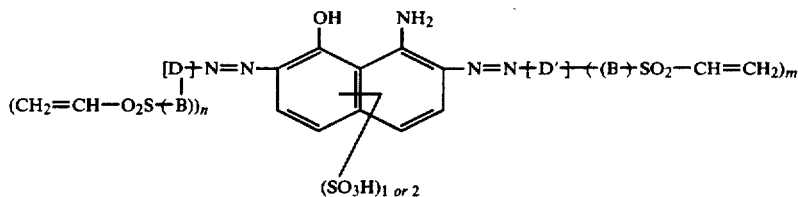
(30)

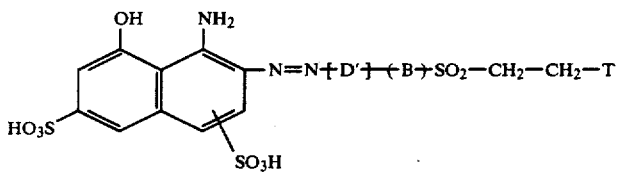
(31)

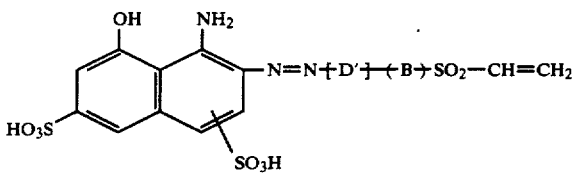
(32)

If in these examples the bridge member B has the meaning of the formula (3) where W=Cl, Br or F, it is perfectly feasible even to replace the halogen on the triazine system by ammonia or $RNH_2$ to give compounds of the structure (34). This is illustrated by the following reaction equation.

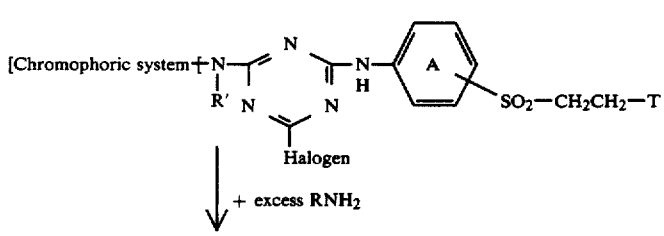
(33)

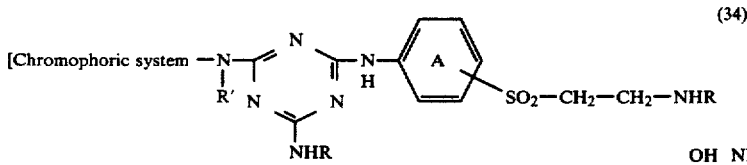
(34)

Dyestuffs of the structure (33) are known, for example, from European Patent Specification Nos. 65,732 and 22,265.

Dyestuff precursors (12), (13) and (16) are prepared in conventional manner by condensing compounds of the formulae (35), (36) and (37) respectively with reactive compounds of the structure Z—L (11).

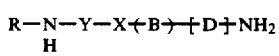
(35)

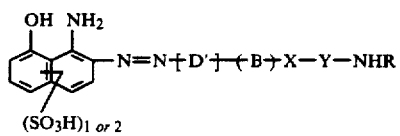
(36)

-continued

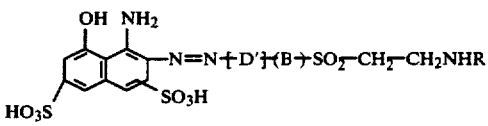
(37)

Compounds of the structure (35) also take the form of, for example, the amines of the formulae (21) to (24).

Further details on the preparation method, for example also on that for the intermediate products, can be found in the examples given hereinafter.

The claimed disazo, trisazo and polyazo reactive dyestuffs can be applied by known methods to hydroxyl- or amide-containing textile materials to obtain navy and green to black dyeings and prints of a high fastness level.

EXAMPLE 1

98.0 g of the dyestuff of the formula

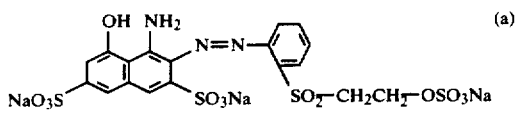
(a)

are dissolved in 300 ml of water under neutral conditions, and 150 ml of 30% strength aqueous methylamine solution are added swiftly. To remove the excess methylamine, either the reaction solution is acidified and the precipitated β-(N-methylamino)ethylsulphonyl compound is isolated by filtration or the reaction solution is brought to pH 12 with sodium hydroxide solution and the solution is brought to the boil for 30 minutes. The dyestuff paste is neutralised in 300 ml of water, of the alkaline dyestuff solution is neutralised on cooling down, and 100 g of solid sodium carbonate are added. An aqueous suspension of diazotised 2-amino-1,5-naphthalenedisulphonic acid (44.0 g) is added, and the mixture is stirred for an hour. To this deep blue solution are added 100 g of ice, followed by 26.0 g of 5-chloro-2,4,6-trifluoropyrimidine, and the reaction solution is held at pH 7-8 by adding solid sodium carbonate. After stirring for 2 hours, 50 g of sodium chloride are added, and the precipitate is filtered off with suction after a further hour. Drying produces a blackish blue powder of the dyestuff of the formula (b); $\lambda_{max}=620$ nm (in H$_2$O), hydrogencarbonate. 150 ml of 30% strength aqueous methylamine solution are then added swiftly, the mixture is stirred for 30 minutes and brought to pH 0.5 with hydrochloric acid, and the precipitated dyestuff is isolated by filtration. This paste is then dissolved in 250 ml of water under neutral conditions and is condensed in conventional manner with 26.0 g of 5-chloro-2,4,6-trifluoropyrimidine to give finished dyestuff (b).

In an even simpler variant of this method of preparation, a mixture of 38.5 g of o-aminophenyl-β-sulphatoethyl sulphone and 44.0 g of 2-amino-1,5-naphthalenedisulphonic acid in 400 ml of water, 80 ml of hydrochloric acid and 200 g of ice are diazotised at 0°-5° C. with 68 ml of 30% strength sodium nitrite solution. The suspension is stirred at 5° C. for 1 hour, and the excess nitrite is removed by adding 3 ml of sulphamic acid. A neutral solution of 46.0 g of 1-amino-8-hydroxy-3,6-naphthalenedisulphonic acid in 100 ml of water are gradually added dropwise, and the reaction solution is then brought to pH 1.0 with sodium carbonate solution. After a further 2 hours of stirring at 5°-10° C., the reaction solution is gradually raised to pH 6.0 by further addition of sodium carbonate solution and is held at this value until a clear blue solution is formed. A mixture of 100 ml of 30% strength aqueous methylamine solution/10 ml concentrated sodium hydroxide solution is then added swiftly, the mixture is stirred for a further 30 minutes and is brought to pH 0.5 with hydrochloric

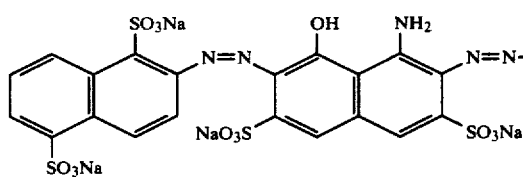 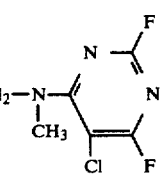
(b)

which produces an oxidation-resistant greenish blue dyeing on cotton.

The same dyestuff (b) can also be prepared by reacting a solution of 98.0 g of monoazo dyestuff (a) with an aqueous suspension of diazotised 2-amino-1,5-naphthalenedisulphonic acid (44.0 g) to give the blue disazo dyestuff. In the course of this reaction, the solution is held at a constant pH 5.5-6.5 by adding solid sodium acid, and the precipitated blue dyestuff is isolated by filtration. This paste is then condensed as described above with 5-chloro-2,4,6-trifluoropyrimidine.

If other reactive components are used in place of 5-chloro-2,4,6-trifluoropyrimidine and ammonia or other amines are used in place of methylamine, this makes it possible to prepare the following dyestuffs which all have virtually the same shade as (b) has.

TABLE 1

| Example | 2 | 3 | 4 | 5 | 6 |
|---|---|---|---|---|---|
| R | H | CH$_3$ | H | H | H |
| Z | [pyrimidine: F, F, Cl] | [pyrimidine: Cl, Cl, Cl] | [pyrimidine: F, CH$_3$, Cl] | [pyrimidine: F, CHCl$_2$, Cl] | [triazine: Cl, Cl] |

TABLE 1-continued

| | 7 | 8 | 9 | 10 |
|---|---|---|---|---|
| R | CH$_3$ | CH$_2$CH$_2$—SO$_3$Na | CH$_3$ | CH$_3$ |
| Z | 6-chloro-2-methyl-4-[(4-sulfonatophenyl)amino]-1,3,5-triazine | 6-fluoro-2-methyl-4-(phenylamino)-1,3,5-triazine | 6-fluoro-2-methyl-4-[(3-sulfonatophenyl)amino]-1,3,5-triazine | —C(=O)—C(Br)=CH$_2$ |

Shifts in shade can be obtained by changing the second diazo component. If compounds of the structure D—NH$_2$ are used in place of 2-amino-1,5-naphthalenedisulphonic acid, the following types of dyestuff can be isolated.

TABLE 2

Structure:

D—N=N—(naphthalene with OH, NH$_2$, NaO$_3$S, SO$_3$Na substituents)—N=N—phenyl—SO$_2$—CH$_2$—CH$_2$—N(R)—Z

| Example | D | R | Z | Shade ($\lambda_{max}$) |
|---|---|---|---|---|
| 11 | 2-methyl-5-sulfophenyl | CH$_3$ | 2,5-dichloro-4,6-difluoropyrimidine (via F) | navy (607 nm) |
| 12 | 5-methoxy-2-sulfophenyl | H | " | greenish blue (622 nm) |
| 13 | 2-methyl-1-sulfonaphthyl | CH$_3$ | " | greenish blue (618 nm) |
| 14 | 3-methyl-6,7-disulfonaphthyl | CH$_3$ | " | greenish blue (620 nm) |
| 15 | 4-sulfophenyl-azo-(2-methyl-5-sulfophenyl) | CH$_3$ | " | greenish black (630 nm) |
| 16 | " | CH$_3$ | 4,6-dichloro-2-methyl-1,3,5-triazine | greenish black (628 nm) |

TABLE 2-continued

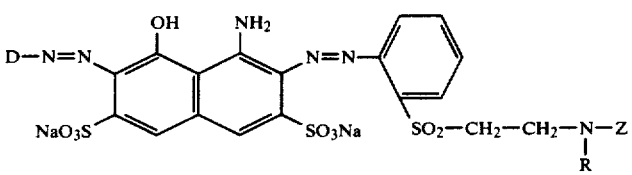

| | D | R | Z | Shade ($\lambda_{max}$) |
|---|---|---|---|---|
| 17 | 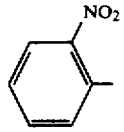 (o-nitrotoluene group) | CH$_2$CH$_2$—SO$_3$Na |  | greenish black (631 nm) |
| 18 | 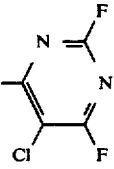 (methyl-sulpho-benzothiazole group) | CH$_3$ | " | greenish blue (629 nm) |

Example 19

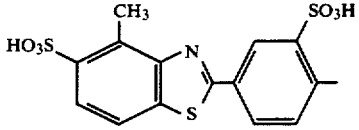

The above dark blue reactive dyestuff can be prepared analogously to Example 1. However, a further version of synthesis will be described by way of illustration:

29.0 g of 2'-aminoethyl 4'-aminophenyl sulphone are dissolved in 200 ml of hydrochloric acid, 100 ml of water and 100 g of ice, and 35 ml of 30% strength sodium nitrite solution are added dropwise; the mixture is stirred at 0°–5° C. for an hour, and the excess nitrite is removed. To this solution is then gradually added dropwise a solution of 8-amino-1-hydroxynaphthalene-3,6-disulphonic acid in 100 ml of water/15 ml of concentrated sodium hydroxide solution, and stirring is continued for 3 hours. The p$#H is then adjusted to 6 by the dropwise addition of dilute sodium hydroxide solution, 100 g of solid sodium carbonate are added, coupling is carried out, and the reaction product is concentrated to the dark blue dyestuff ($\lambda_{max}$=615 nm) described under Example 1.

In this case too a number of new reactive dyestuffs can be prepared by appropriate choice of the components D—NH$_2$ and Z—L.

TABLE 3

| Example | D | Z | Shade($\lambda_{max}$) |
|---|---|---|---|
| 20 | 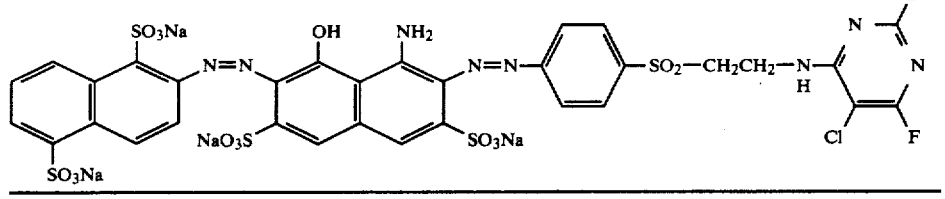 | 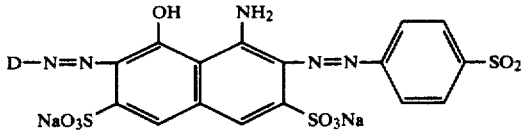 | greenish blue (614 nm) |
| 21 | 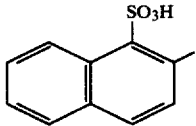 | " | greenish black (628 nm) |

TABLE 3-continued

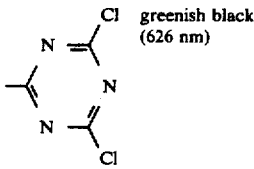

| Example | D | Z | Shade($\lambda_{max}$) |
|---|---|---|---|
| 22 | " | −C(=O)−C(Br)=CH$_2$ | black (on wool) |
| 23 | " | (dichlorotriazinyl) | greenish black (626 nm) |
| 24 | " | (fluoro-chloro-methylpyrimidinyl) | greenish black (628 nm) |

EXAMPLE 25

If, starting from 98.0 g of the monoazo dyestuff of the formula (c)

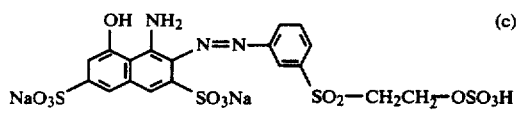

all reactions are carried out as in Example 1, this leads to a new bright navy reactive dyestuff of the structure (d).

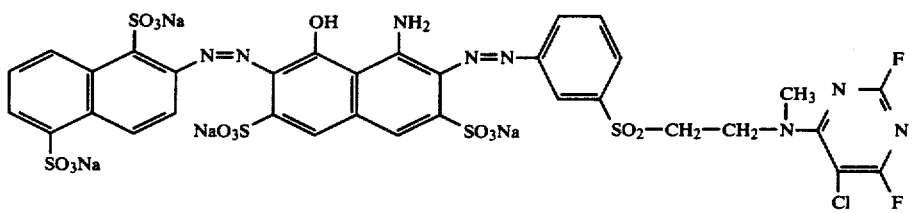

(d, $\lambda_{max}$ = 605 nm)

The following types of dyestuff can be prepared by changing the amine R—NH$_2$ and/or the reactive component.

TABLE 4

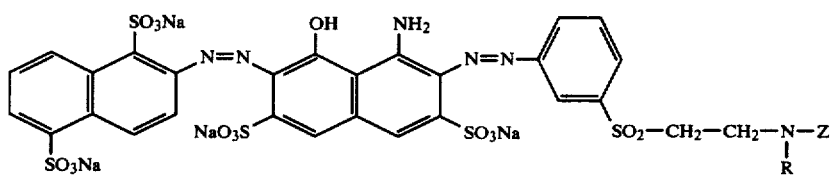

| Example | 26 | 27 | 28 | 29 |
|---|---|---|---|---|
| R | H | CH$_3$ | C$_2$H$_5$ | CH$_3$ |

TABLE 4-continued

[Structure shown: naphthalene disulfonate with SO₃Na groups, connected via N=N azo linkage to a naphthalene diol with OH, NH₂, NaO₃S, SO₃Na substituents, then another N=N azo linkage to a phenyl ring bearing SO₂—CH₂—CH₂—N(R)—Z]

| Example | 26 | 27 | 28 | 29 |
|---|---|---|---|---|
| Z | pyrimidine with N, F, Cl, F, CH₃ substituents | pyrimidine with N, Cl, Cl, Cl substituents | pyrimidine with N, F, Cl, CH₃ substituents | —C(O)—C(Br)=CH₂ |

By varying and combining reactants which have been repeatedly mentioned plus components not yet mentioned D—NH₂, H₂N—D'—X—Y—NRZ (where X=SO or Y=—(CH₂)₃—) or 8-amino-1-naphthol-3,5-disulphonic acid, it is possible to synthesise further new reactive dye-stuffs, such as, for example,

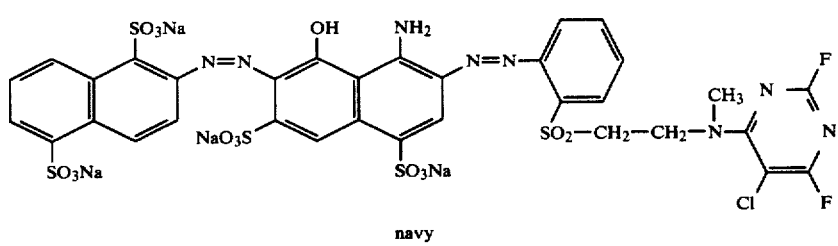

Example 30 navy

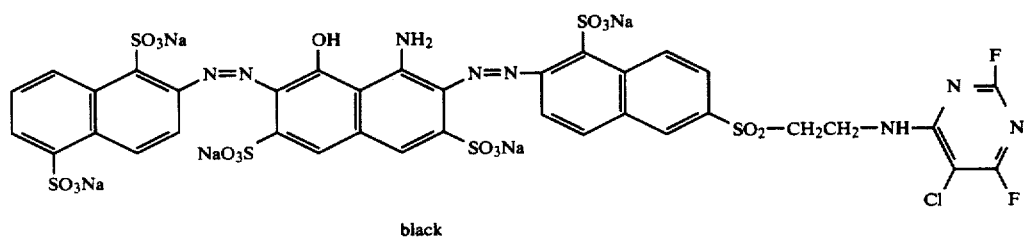

Example 31 black

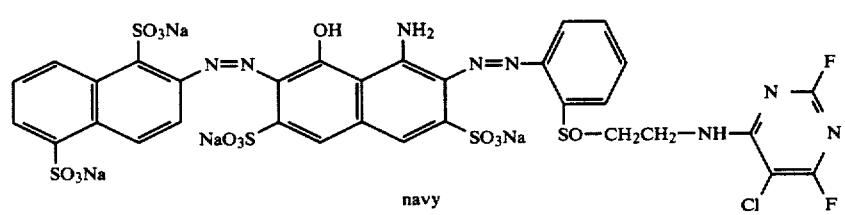

Example 32 navy

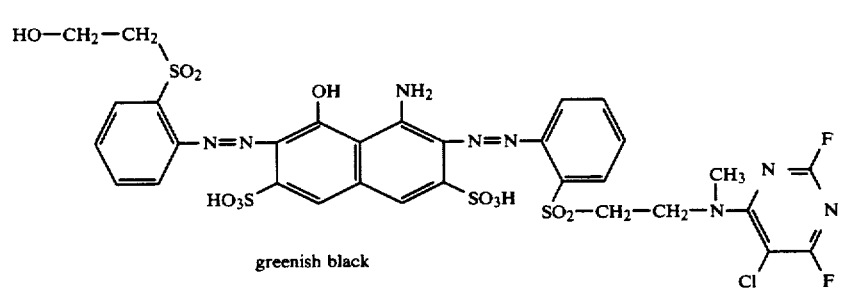

Example 33 greenish black

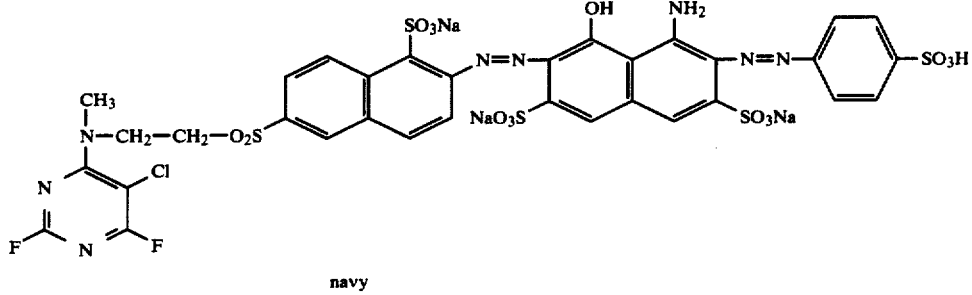
Example 34
navy
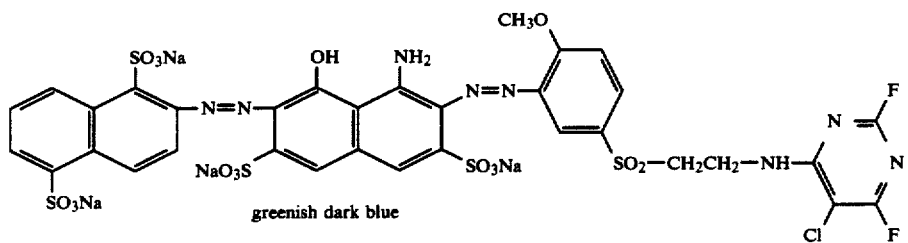
Example 35
greenish dark blue
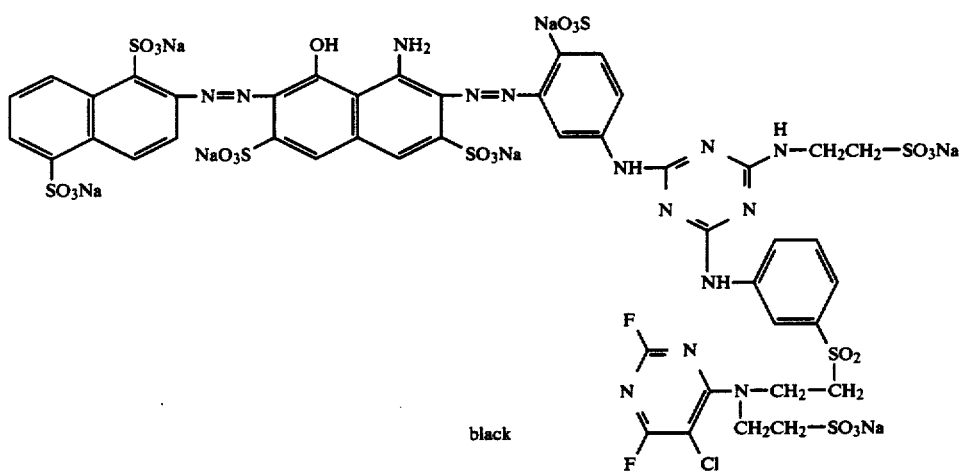
Example 36
black
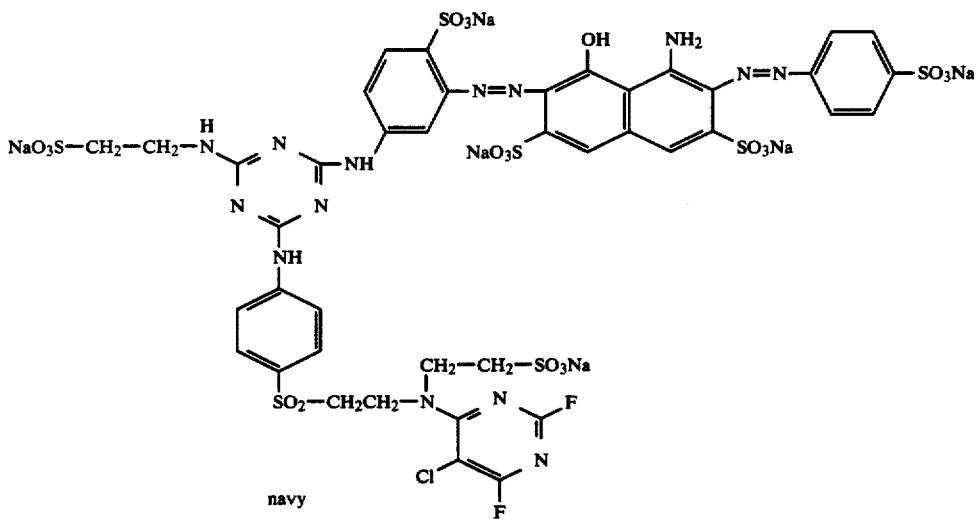
Example 37
navy -continued

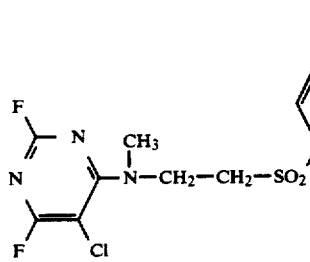
black

Example 38
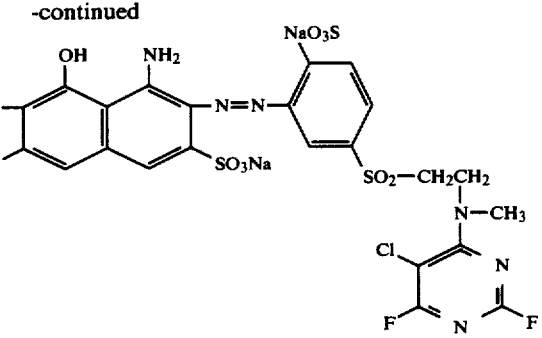

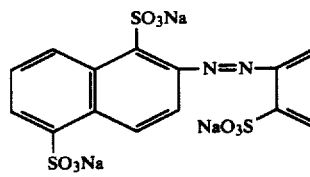
greenish blue

Example 39
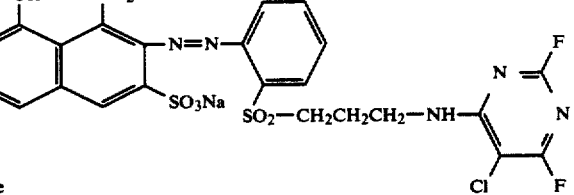

DYEING METHOD

A 300 ml capacity dyeing beaker in a heatable waterbath is filled with 170 ml of water at 20°–25° C. 0.6 g of the dyestuff obtained in Example 1 is thoroughly pasted up with 2 ml of cold water, and 30 ml of hot water (70° C.) are added to the paste; the dyestuff dissolves. This solution is added to the water in the dyeing beaker, and 10 g of cotton yarn are kept in constant agitation in this dyeing liquor. The temperature of the dyeing liquor is raised to 40°–50° C. in the course of 10 minutes, 10 g of anhydrous sodium sulphate are added, and dyeing is continued for 30 minutes. 4 g of anhydrous sodium carbonate are then added to the dyeing liquor, and dyeing is continued at 40° to 50° C. for 60 minutes. The dyed material is removed from the dyeing liquor, the adherent liquor is removed by wringing out or squeezing off the yarn, and the yarn is rinsed, first with cold water and then with hot water, until the rinse liquor is no longer discoloured. The dyed material is then soaped at the boil for 20 minutes in 200 ml of a liquor which contains 0.2 g of sodium alkylsulphate, is rinsed again, and is dried at 60°–70° C. in a drying cabinet. The result is a deep dark blue dyeing of excellent wash and chlorine fastness.

We claim:
1. A reactive dyestuff of the formula

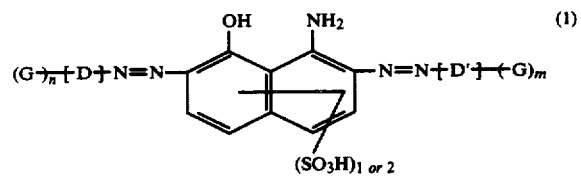  (1)

or their alkali metal salts, where
G is a radical of the formula

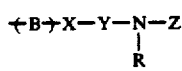

n and m are each 0 or 1 such that $n+m=1$ or 2,

D and D' are each a benzene, naphthalene or heterocyclic radical or a benzene, naphthalene or heterocyclic radical substituted by an azo-containing radical, B is a direct bond between D or D' and X or a bridge member of the structure (2) to (5)

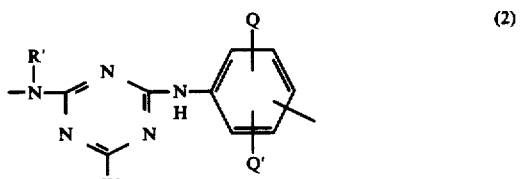  (2)

  (3)

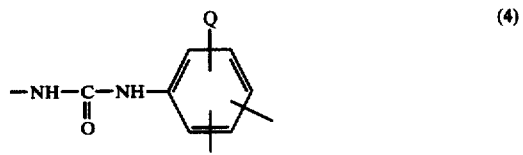  (4)

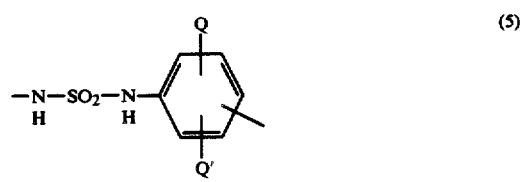  (5)

each of which is bonded with the amine function to a C atom of the ring system of D or D' and with the free bond of the phenyl system to X, X is S, SO or $SO_2$, Y is $C_1$–$C_6$-alkylene unsubstituted or substituted by —OH, —$SO_3H$, —COOH or -halogen, R is H, $C_1$-$C_4$-alkyl unsubstituted or substituted by —OH, —$SO_3H$, —COOH, -halogen or —$OSO_3H$,
Z is a fibre-reactive radical,
R' is H, $C_1$-$C_4$-alkyl which is unsubstituted or substituted by —OH or —COOH; or phenyl which is unsubstituted or substituted by —OH or —COOH,
W is OH, Cl, F, Br, $SO_3H$, NHR'

alkoxy, phenoxy and
Q and Q', independently of each other, are each H, OH, halogen, $SO_3H$ COOH, $C_1$-$C_4$-alkyl or $C_1$-$C_4$-alkoxy.

2. A reactive dyestuff according to claim 1 of the formula

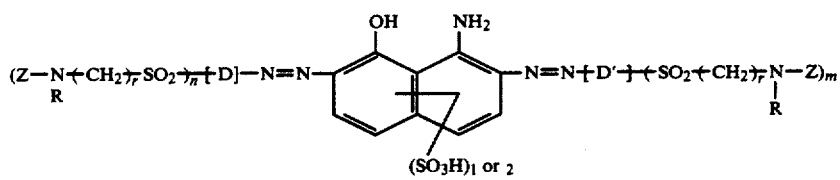

(6)

wherein
r is 2 or 3
and where
D, D', m, n, R, R', Z, W, Q and Q' are as defined in claim 1.

3. A reactive dyestuff according to claim 1 of the formula

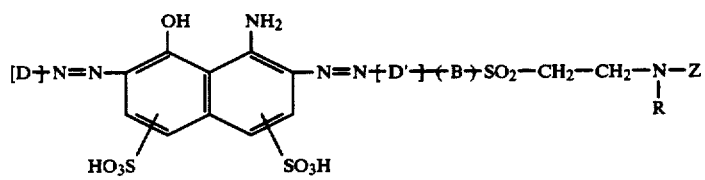

where
D, D', B, R and Z are as defined in claim 1.

4. A reactive dyestuff according to claim 3, characterised in that D represents a naphthalene monosulphonic or disulphonic acid radical of the formula

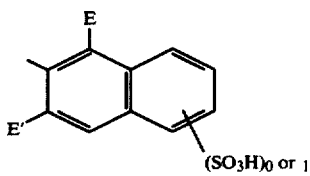

(8)

wherein
one of the radicals E and E' represents H while the other represents $SO_3H$,
or in that D represents an azobenzenesulphonic acid radical of the formula (9)

(9)

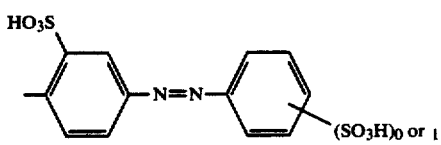

B, R and Z are as defined in claim 3 and
D' represents phenylene or $C_1$-$C_4$-alkoxy-substituted (7)

phenylene or naphthalene or sulpho-substituted naphthalene.

5. A reactive dyestuff according to claim 1, characterised in that Z represents a fibre-reactive halogenopyrimidine or halogenotriazine radical.

* * * * *

UNITED STATES PATENT AND TRADEMARK OFFICE
CERTIFICATE OF CORRECTION

PATENT NO. : 4,638,054
DATED : January 20, 1987
INVENTOR(S) : Karl J. Herd, et al.

Page 1 of 2

It is certified that error appears in the above-identified patent and that said Letters Patent is hereby corrected as shown below:

| | |
|---|---|
| Title Page, after list of U.S. Patent Documents | Insert --FOREIGN PATENT DOCUMENTS DE-A-1,419,791; DE-A-1,419,173; DE-A-2,106,648 and Chem. Abs., Vol. 95, No. 2 (July 1981)-- |
| U.S. Patent Documents, 3rd line | After "3/1964" delete "Hensbl" and substitute --Hensel-- |
| Col. 2, line 47 | After the first "R'," delete "n, m, B, R, R'," |
| Col. 4, line 13 | Before "to" delete "dye-stuffs" and substitute --dyestuffs-- |
| Col. 5, line 10 | After "or" delete "bromone" and substitute --bromine-- |
| Col. 5, line 37 | After "o" and before "," insert -- - -- |
| Col. 5, line 47 | After "(N-iso-propylphenyl) insert -- - -- |
| Col. 7, line 37 | After "via" delete "nirogen" and substitute --nitrogen-- |
| Col. 9, line 5 | Insert connecting line to "HO$_3$S" in formula as follows: [chemical structure showing HO$_3$S connected to vinyl group] |
| Col. 10, line 1 | Delete "(where p=0,1,2,3)," first instance |
| Col. 11, line 39 | After "also" delete "b" and substitute --be-- |

UNITED STATES PATENT AND TRADEMARK OFFICE
CERTIFICATE OF CORRECTION

PATENT NO. : 4,638,054

DATED : January 20, 1987

INVENTOR(S) : Karl J. Herd, et al.

Page 2 of 2

It is certified that error appears in the above-identified patent and that said Letters Patent is hereby corrected as shown below:

| | |
|---|---|
| Col. 11, line 55 | After "with" delete "acylonitrile" and substitute --acrylonitrile-- |
| Col. 12, line 41 | Before "known" delete "if" and substitute --is-- |
| Col. 13, line 34 | After "system" delete "[" and substitute --]-- |
| Col. 13, line 50 | After "system" delete "-" and substitute --⅓-- |
| Col. 14, line 30 | Delete "(37)" |
| Col. 14, line 54 | After formula insert --(37)-- |
| Col. 15, line 16 | After "water," delete "of" and substitute --or-- |
| Col. 23, line 5 | Delete "Example 26  27  28  29" and substitute: <br> --Example  26  27  28  29-- <br> R  H  $CH_3$  $C_2H_5$  $CH_3$ |
| Col. 29, line 16 | Insert --,-- between "$SC_3H$" and "COOH" |

Signed and Sealed this

Fifth Day of July, 1988

Attest:

DONALD J. QUIGG

Attesting Officer

Commissioner of Patents and Trademarks